US012249785B2

(12) United States Patent
Wan Sulaiman et al.

(10) Patent No.: US 12,249,785 B2
(45) Date of Patent: Mar. 11, 2025

(54) RETAINER FOR RETAINING ACCESSORY PLUG AND CABLE TO A PORTABLE COMMUNICATION DEVICE

(71) Applicant: MOTOROLA SOLUTIONS, INC., Chicago, IL (US)

(72) Inventors: Wan Mohd Ariff Wan Sulaiman, Penang (MY); Cheah Chan Kee, Penang (MY); Beng Kwang Tan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 359 days.

(21) Appl. No.: 18/051,396

(22) Filed: Oct. 31, 2022

(65) Prior Publication Data

US 2024/0145979 A1 May 2, 2024

(51) Int. Cl.

*H01R 13/506* (2006.01)
*H01R 13/502* (2006.01)
*H01R 13/52* (2006.01)

(52) U.S. Cl.

CPC ....... *H01R 13/506* (2013.01); *H01R 13/5025* (2013.01); *H01R 13/5205* (2013.01)

(58) Field of Classification Search

CPC .............. H01R 13/506; H01R 13/5025; H01R 13/5205; H01R 24/58; H01R 2201/24; H01R 13/6392

See application file for complete search history.

(56) References Cited

U.S. PATENT DOCUMENTS 7,559,788 B2 7/2009 Legg
8,469,732 B2 6/2013 Sen et al.
8,469,734 B2 * 6/2013 Chen .................... H01R 13/506 439/353
9,300,086 B1 3/2016 Qu et al.
(Continued)

FOREIGN PATENT DOCUMENTS

EP 2182538 A1 5/2010
WO 2013025335 A1 2/2013
WO 2021221837 A1 11/2021

OTHER PUBLICATIONS

Motorola Solutions Inc., "Retainer Kit," <https://shop.motorolasolutions.com/retainer-clip-kit/product/RLN5500A> available as of Aug. 12, 2022 (2 pages).

(Continued)

*Primary Examiner* — Briggitte R. Hammond
(74) *Attorney, Agent, or Firm* — Michael Best & Friedrich LLP

(57) ABSTRACT

A retainer includes a main body having a top wall, a first side wall, a second side wall spaced opposite the first side wall, a front wall, and a rear wall spaced opposite the front wall along a longitudinal axis. The walls define an interior cavity sized and shaped to receive an accessory plug. The front wall defines a front opening that extends into the interior cavity and is sized and shaped to receive a portion of a cable. The front wall also includes a first hook and a second hook each positioned below the front opening. The rear wall includes a third hook extending forward into the interior cavity. The retainer is moved forward linearly, and parallel to the longitudinal axis, to secure the hooks to a portable communications device.

20 Claims, 10 Drawing Sheets

(56) References Cited

U.S. PATENT DOCUMENTS 11,050,189 B1 6/2021 Garcia et al.

OTHER PUBLICATIONS

Sensear, "Motorola Mototrbo Slim Cable (with inline PTT) for SM1R/SM1B/SM1P," <https://shop.sensear.com/cables/motorola-mototrbo-slim-cable-with-inline-ptt-for-sm1r-sm1b-sm1p/> available as of Aug. 12, 2022 (5 pages).
Hitechwireless, "Kenwood NXP1300AUK Analog UHF Two Way Radio," <https://www.hitechwireless.com/kenwood-nxp1300auk-analog-uhf-two-way-radio/> available as of Aug. 12, 2022 (4 pages).
Locuradigital, "Kenwood NX1300DE3 walkie without analog display UHF 400-470 Mhz DMR," <https://www.locuradigital.com/en/digital_handhelds/kenwood_nexedge/kenwood-nx1300de3-walkie-without-analog-display-uhf-400-470-mhz-dmr.htm> available as of Aug. 12, 2022 (4 pages).
Youtube, "Kenwood NX-13000 Two-Way Radio Components and Assembly | Two Way Direct," <www.youtube.com/watch?v=RCmzHIHtfU0> published Nov. 15, 2021 (1 page).
International Search Report and Written Opinion for Application No. PCT/US2023/075326, dated Jan. 16, 2024 (10 pages).

* cited by examiner

RETAINER FOR RETAINING ACCESSORY PLUG AND CABLE TO A PORTABLE COMMUNICATION DEVICE

BACKGROUND OF THE INVENTION

Accessory plugs and cables, such as for audio jacks, are often attached to a portable communication device. Retainers may be used to retain the accessory plugs and cables in place on the portable communication device. Many of these retainers use screws to facilitate retention. However, inadvertent pulling or tugging on the accessory plug and/or cable may impart high forces on the retainer and/or screw.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments, examples, and aspects.

Figure 1:
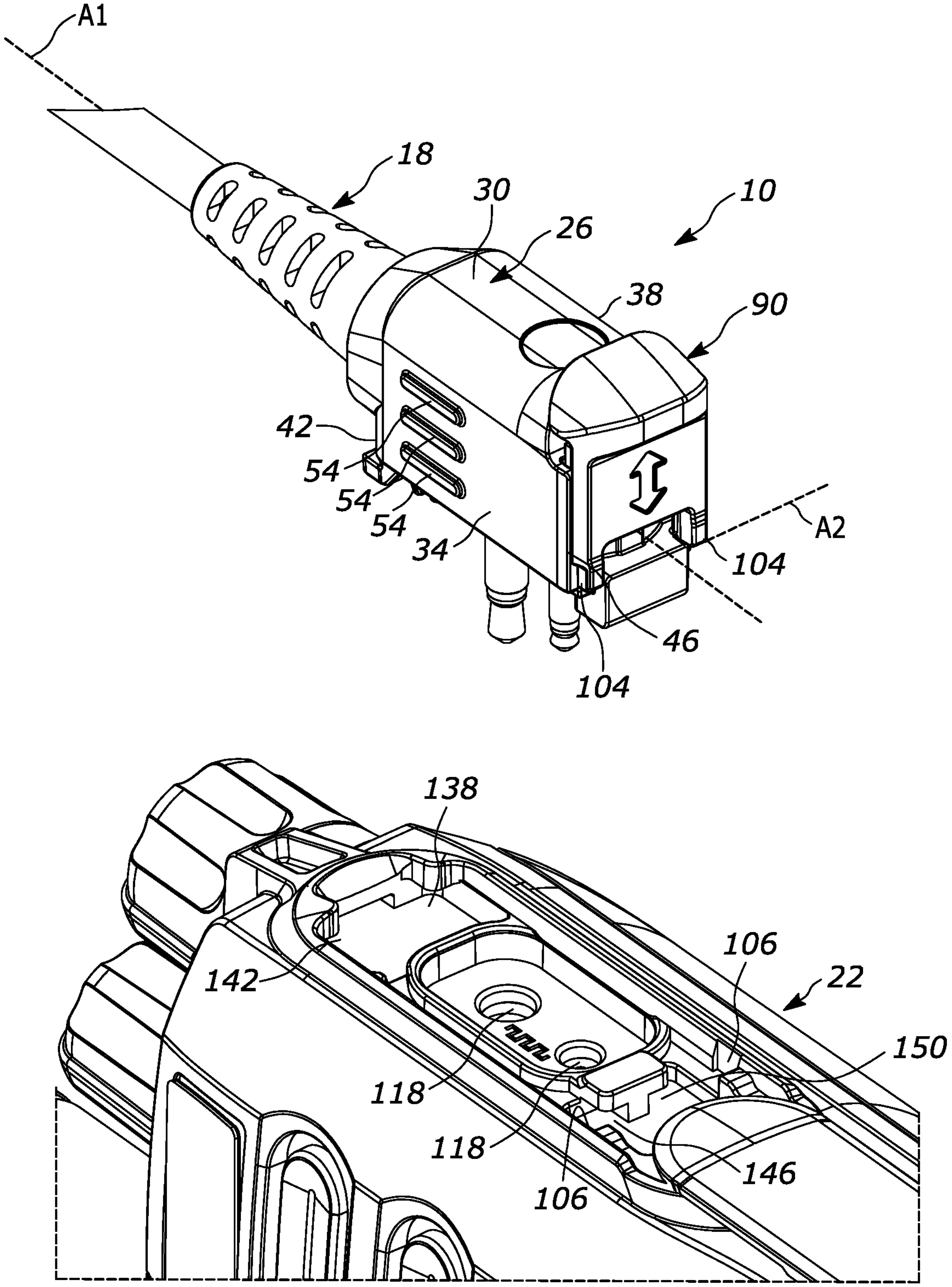
FIG. 1 is a perspective view of both a portable communication device and a retainer in accordance with one example, the retainer being coupled to an accessory plug and cable.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, and aspects, and features.

The apparatus and method components have been represented where appropriate by conventional symbols in the drawings, showing only those specific details that are pertinent to understanding various embodiments, examples, aspects, and features so as not to obscure the disclosure with details that will be readily apparent to those of ordinary skill in the art having the benefit of the description herein.

DETAILED DESCRIPTION OF THE INVENTION

As noted above, it is important that retainers withstand high forces imparted by pulling or tugging of the accessory plug and cable, and maintain retention of the accessory plug and cable to the portable communication device. Accordingly, there is a need for an improved retainer for retaining an accessory plug and cable to a portable communication device.

Briefly, therefore, there is provided herein an improved retainer for retaining an accessory plug and cable to a portable communication device. The retainer, in accordance with one example, includes a main body having a top wall, a first side wall, a second side wall spaced opposite the first side wall, a front wall, and a rear wall spaced opposite the front wall along a longitudinal axis. The top wall, the first side wall, the second side wall, the front wall, and the rear wall define an interior cavity sized and shaped to receive the accessory plug. The front wall defines a front opening that extends into the interior cavity and is sized and shaped to receive a portion of the cable. The front wall includes a first hook and a second hook each positioned below the front opening. The rear wall includes a third hook extending forward into the interior cavity. The retainer is configured to be moved forward linearly, and parallel to the longitudinal axis, to secure the first hook, the second hook, and the third hook to the portable communications device.

FIGS. 1-14 illustrate a retainer 10 for retaining an accessory plug 14 and a cable 18 to a portable communication device 22. In the illustrated example, the portable communication device 22 is a portable handheld radio, and the accessory plug 14 and the cable 18 are integrally formed together as a single piece to be coupled to a headphone (not shown). In other examples, the portable communication device 22 is a phone, a tablet, or other portable communication device. Additionally, in other examples, the accessory plug 14 and the cable 18 are coupled to devices other than a headphone (e.g., other audio accessory devices). A system includes the retainer 10 and the portable communication device 22.

Figure 2:
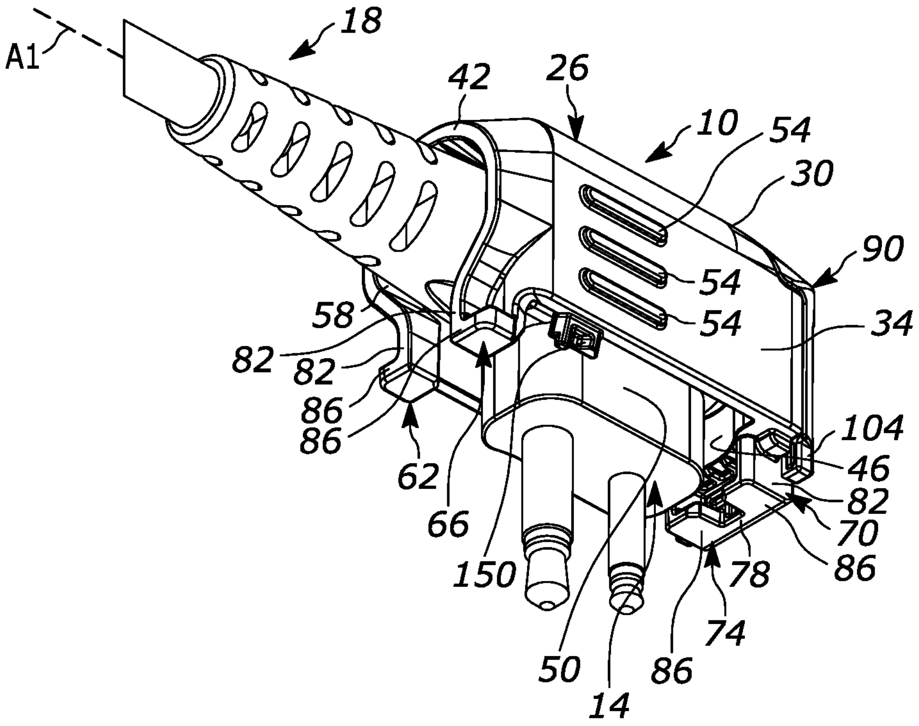
FIGS. 2 and 3 are perspective and front views, respectively, of the retainer, illustrating an omega-shaped front wall of the retainer.
Figure 3:
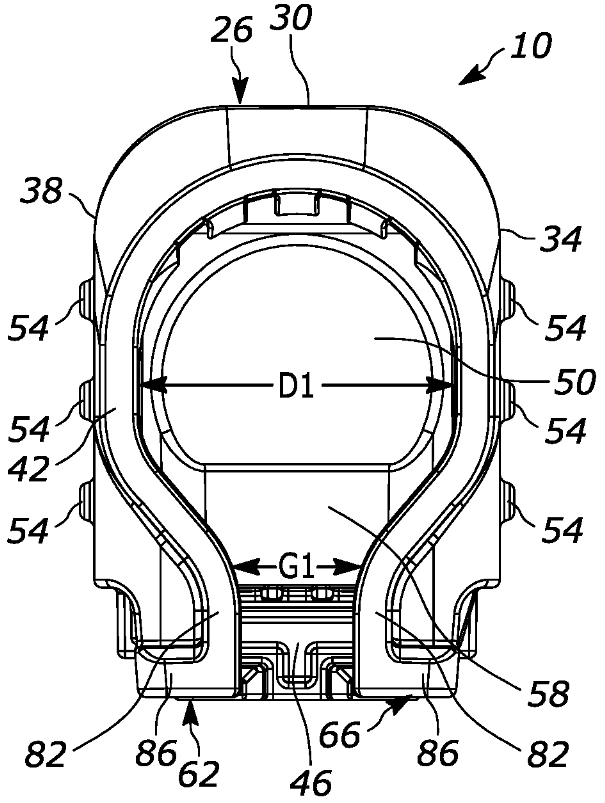

With reference to FIGS. 1-3, in the illustrated example, the retainer 10 includes a main body 26 having a top wall 30, a first side wall 34, and a second side wall 38 spaced opposite the first side wall 34. The main body 26 also includes a front wall 42, and a rear wall 46 spaced opposite the front wall 42 along a longitudinal axis A1 (FIG. 1). The top wall 30, the first side wall 34, the second side wall 38, the front wall 42, and the rear wall 46 define an interior cavity 50 (FIGS. 2 and 3) sized and shaped to receive the accessory plug 14.

In the illustrated example, the first side wall 34 extends parallel to the second side wall 38, and the front wall 42 extends parallel to the rear wall 46. The main body 26 has a generally rectangular shape when viewed from above or from the side. The top wall 30 transitions into the first side wall 34 with a beveled or filleted edge. Similarly, the top wall 30 transitions into the second side wall 38 with a beveled or filleted edge. Other examples include different shapes and/or sizes for the retainer 10 than that illustrated, such as shapes that are more elongated, or square, or shapes where the front wall 42 is not parallel to the rear wall 46, and/or the first side wall 34 is not parallel to the second side wall 38.

With continued reference to FIGS. 1-3, the first side wall 34 and the second side wall 38 each include a set of ribs 54 that extend parallel to the longitudinal axis. The ribs 54 facilitate gripping of the retainer 10. In other examples, the retainer 10 includes no ribs 54, or other numbers and arrangements of ribs 54 than that illustrated.

With reference to FIGS. 2 and 3, the front wall 42 defines a front opening 58 that extends into the interior cavity 50 and is sized and shaped to receive a portion of the cable 18. As illustrated in FIGS. 2 and 3, the front wall 42 has an omega shape (as viewed for example along the longitudinal axis A1 in FIG. 3) that defines the front opening 58. In the illustrated example, at least a portion of the front opening 58 has a circular shape.

With continued reference to FIGS. 2 and 3, the front wall 42 includes a first hook 62 positioned below the front opening 58, and a second hook 66 positioned below the front opening 58. The rear wall 46 includes a third hook 70 extending forward into the interior cavity 50, and a fourth hook 74 extending forward into the interior cavity 50. In the illustrated example, the third hook 70 and the fourth hook 74 are coupled to one another with a bridge 78. The first hook 62 and the second hook 66 are front hooks, and the third hook 70 and the fourth hook 74 are rear hooks. In some examples, only a single rear hook (e.g., third hook 70) is provided, rather than multiple rear hooks.

As illustrated in FIGS. 2 and 3, each of the first hook 62 and the second hook 66 includes an L-shaped arm having a first segment 82 that extends down vertically, and a second segment 86 that extends perpendicularly away from the first segment 82. As illustrated in FIGS. 2 and 3, the second segment 86 of the first hook 62 and the second segment 86 of the second hook 66 extend laterally away from one another, and are separated from one another by a gap G1. The front opening 58 has a diameter D1, and the gap G1 is smaller than the diameter D1. The first hook 62 and the second hook 66 are each flexible, and are able to flex laterally apart from one another.

With continued reference to FIGS. 2 and 3, each of the third hook 70 and the fourth hook 74 also includes a first segment 82 that extends down vertically, and a second segment 86 that extends perpendicularly away from the first segment 82. The second segments 86 of the third and fourth hooks 70, 74 extend laterally toward one another. In some examples, the third hook 70 and/or the fourth hook 74 is flexible, and is able to flex forward for example about an axis A2 (FIG. 1) that is perpendicular to the longitudinal axis A1. In some examples, the second segments 86 of the third and fourth hooks 70, 74 extend laterally away from one another.

Figure 12:
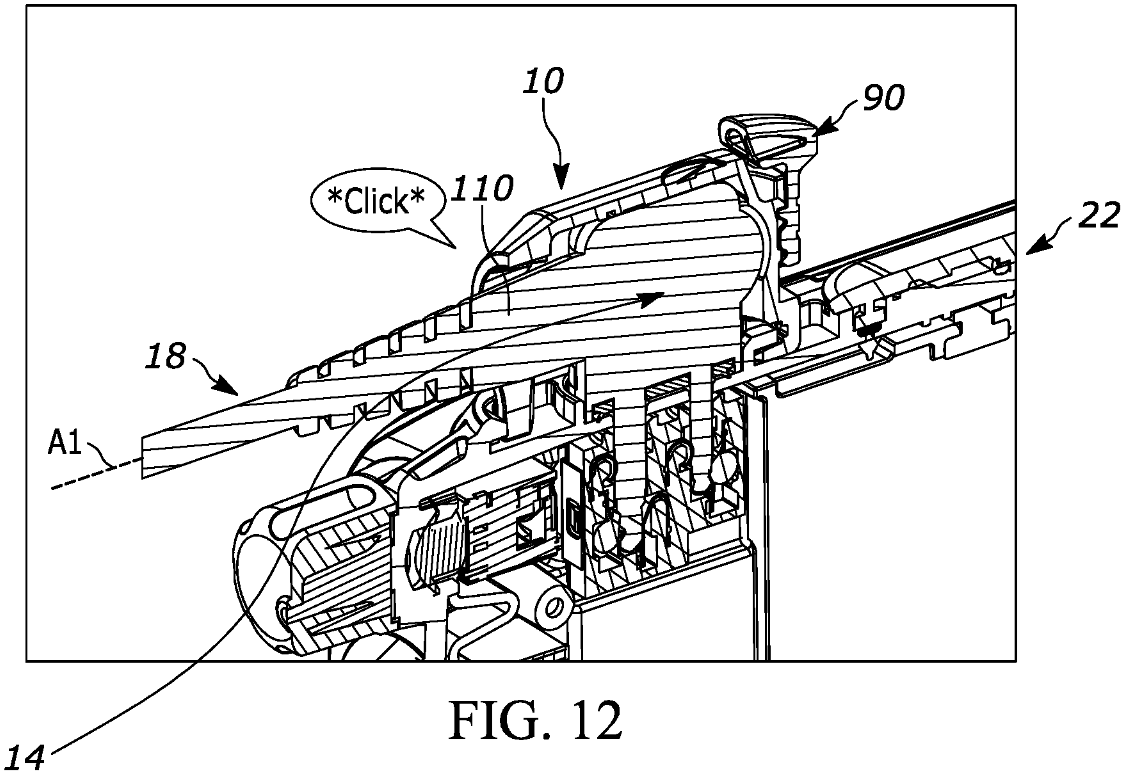
Figure 13:
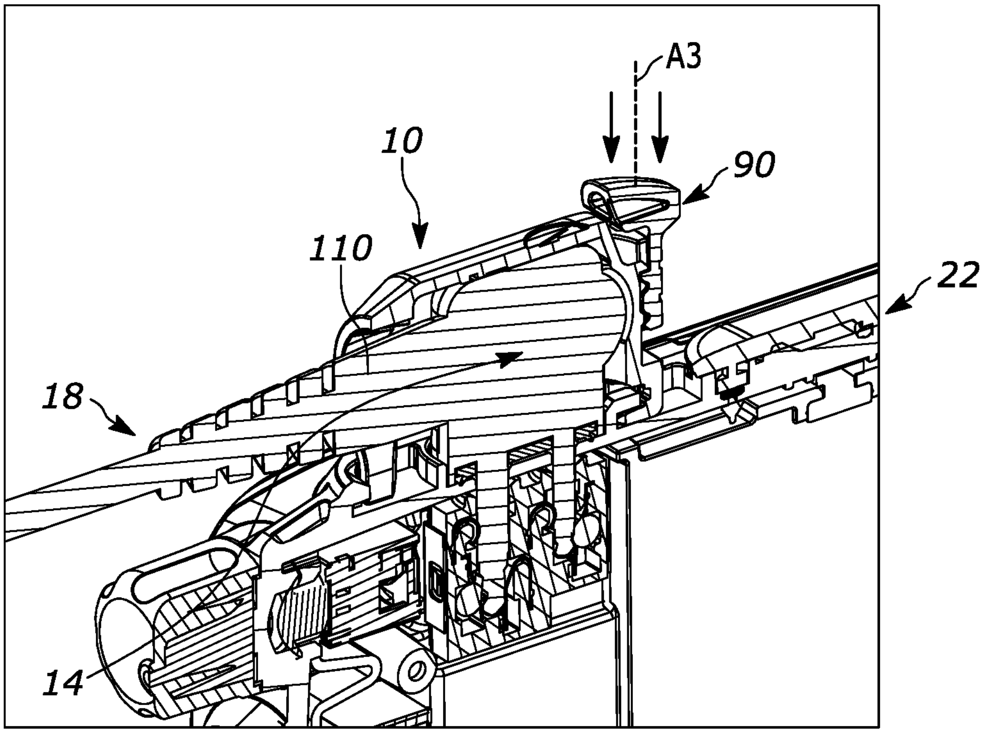
FIGS. 13 and 14 illustrate a third step of coupling the retainer to the portable communication device.
Figure 14:
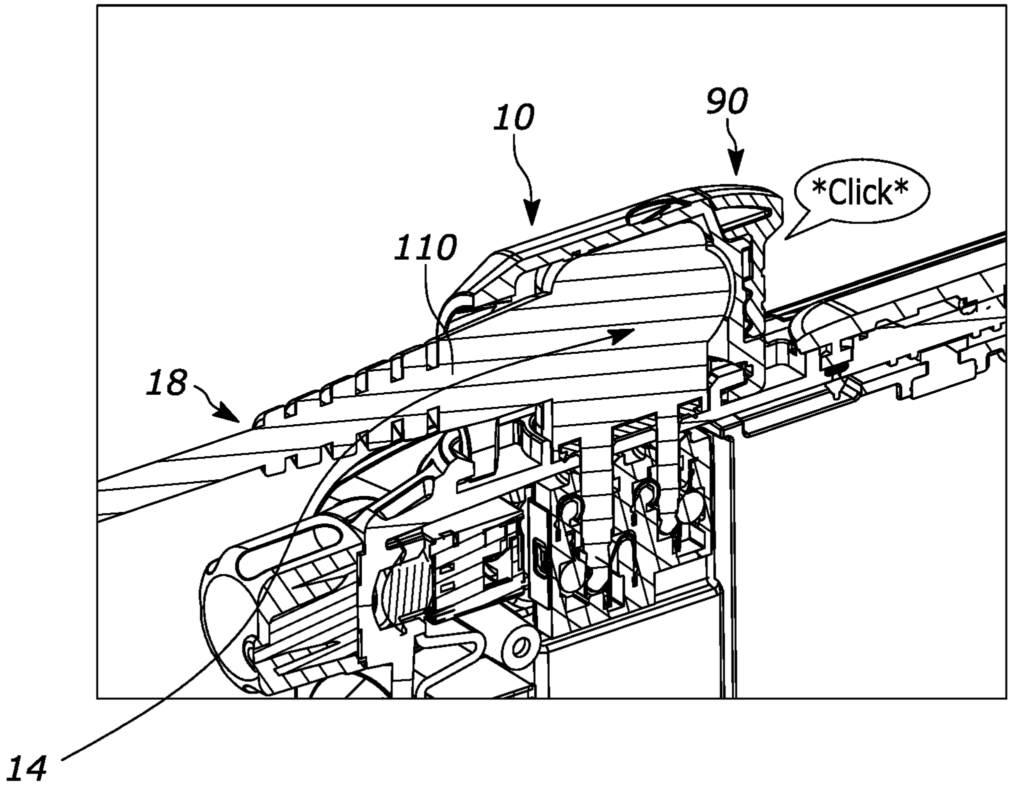

With reference to FIGS. 1, 2, and 9-14, the retainer 10 also includes a latch 90 coupled to the main body 26 along the rear wall 46, and is movable relative to the main body 26 along an axis A3 (FIG. 9) that is perpendicular to the longitudinal axis A1. The latch 90 may be moved vertically between an unlocked (e.g., raised) position, as seen in FIGS. 1 and 9-13, and a locked (e.g., lowered) position, as seen in FIGS. 2 and 14. In some examples, when the latch 90 is in the unlocked position, the latch 90 is spaced vertically from the third hook 70 and the fourth hook 74, and when the latch 90 is in the locked position, the latch 90 is in contact with the third hook 70 an the fourth hook 74. With reference FIG. 10, in the illustrated example the latch 90 includes a detent arm 94 having notches 98 corresponding to a locked (e.g., lowered) and unlocked (e.g., raised) state. The rear wall 46 of the main body 26 includes a stopper 100, and a protrusion 102 positioned below the stopper 100 that engages and disengages the notches 98 to lock and unlock the latch 90, respectively. In other examples, the rear wall 46 includes the detent arm 94 and the notches 98, and the latch 90 includes the protrusion 102. Other examples include other types of detent mechanisms (e.g., for snap-fit engagement between the latch 90 and the main body 26) than that illustrated. In some examples, no detent mechanism is provided. Instead, the latch 90 is held for example in the locked position relative to the main body 26 via a frictional fit with the main body 26, or with a fastener, or with other structures. With reference to FIG. 1, in the illustrated example the latch 90 also includes latch lock arms 104 that slide into corresponding recesses 106 (e.g., notches) on the portable communication device 22 when the latch 90 is locked, to further inhibit or prevent the retainer 10 from sliding along the longitudinal axis A1.

Figure 4:
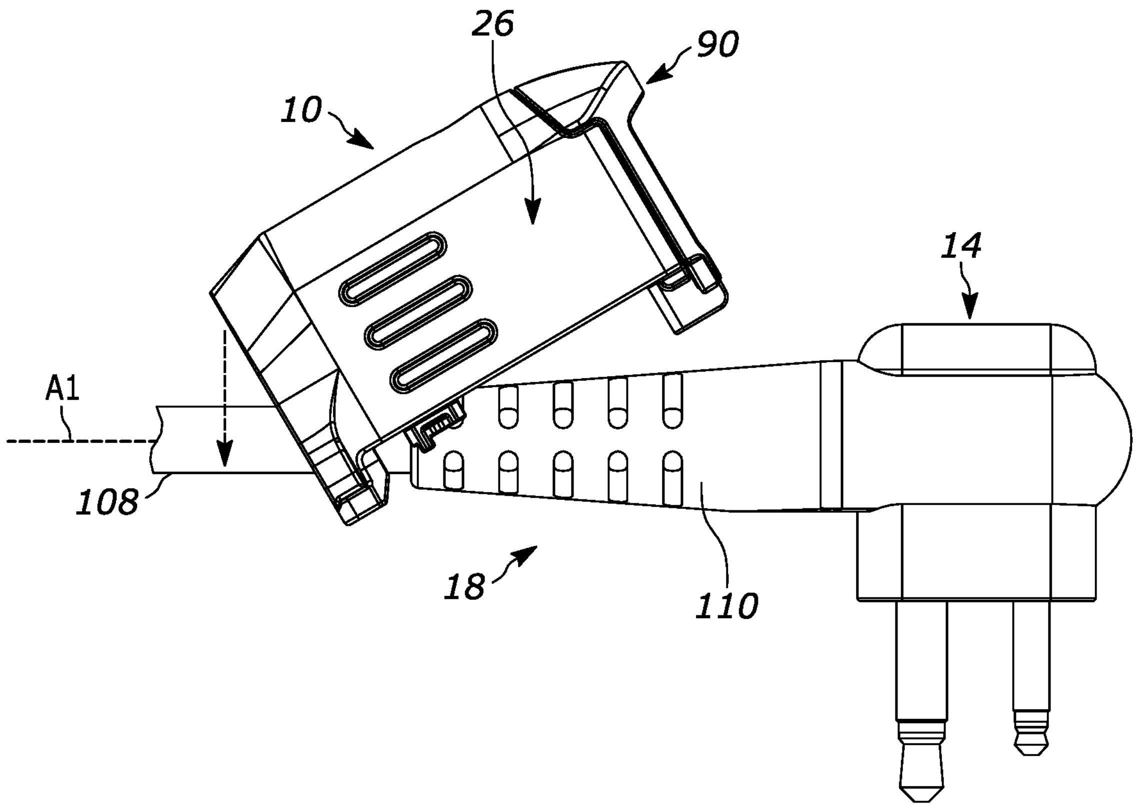
FIGS. 4, 5, and 6 are side views of the retainer, illustrating how the retainer may initially be coupled to the accessory plug and cable.

With reference to FIGS. 3-6, the retainer 10 is coupled to the accessory plug 14 and the cable 18, such that the accessory plug 14 is positioned within the interior cavity 50 of the main body 26, and the cable 18 extends out of the front opening 58. As illustrated in FIG. 4, the cable 18 includes a first portion 108 having a first diameter, and a strain relief portion 110 having a second diameter that is larger than the first diameter. The strain relief portion 110 may have a tapering diameter that increases moving toward the accessory plug 14. The diameter of the first portion 108 is larger than the gap G1, but smaller than the diameter D1 of the front opening 58.

With continued reference to FIG. 4, the retainer 10 is coupled to the accessory plug 14 and the cable 18 by initially tilting the retainer 10 relative to the longitudinal axis A1. A lower portion of the omega-shaped front wall 42 is then clipped (e.g., snapped) over the first portion 108 of the cable 18. During this initial attachment, the first and second hooks 62, 66 flex laterally outwardly apart from one another, opening the gap G1 further, and allowing the cable 18 to snap upwardly into the front opening 58. In some examples, the diameter of the first portion 108 is the same or smaller than the gap G1.

Figure 5:
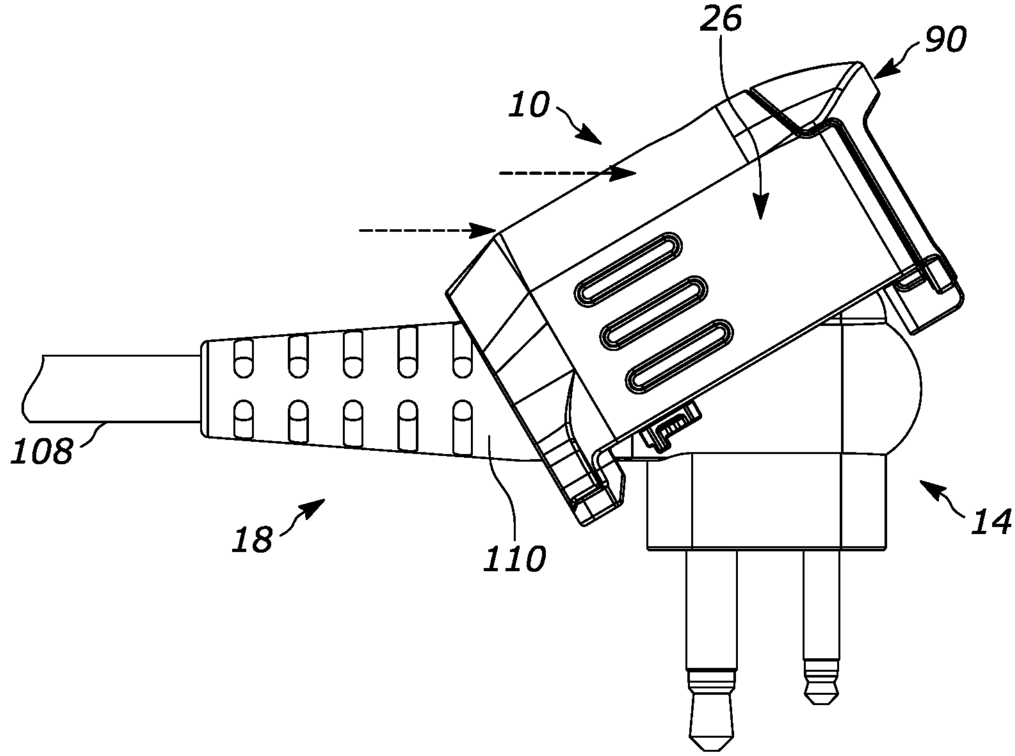

With reference to FIG. 5, the retainer 10 is then moved (e.g., slid) linearly along the cable 18 (e.g., along the longitudinal axis A1), until the main body 26 is generally positioned over the accessory plug 14. The retainer 10 remains tilted during this movement.

Figure 6:
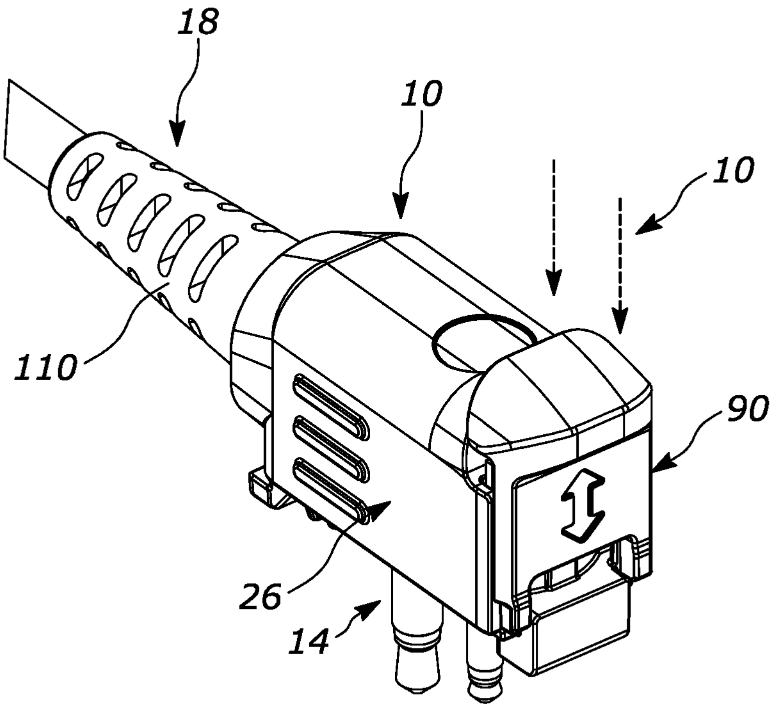

With reference to FIG. 6, the retainer 10 is then tilted down over the accessory plug 14, such that the accessory plug 14 is at least substantially enclosed by the walls of the main body 26, and the rear wall 46 and third and further hooks 70, 74 extend down behind the accessory plug 14. In this position, a section of the strain relief portion 110 extends through the front opening 58.

As described above, the strain relief portion 110 has a diameter that is larger than the diameter of the first portion 108 of the cable 18. In some examples, the diameter of the strain relief portion 110 is large enough such that the first and second hooks 62, 66 cannot flex far enough apart to accommodate the diameter of the strain relief portion 110. The retainer 10 therefore cannot simply be lifted up vertically off of the accessory plug 14 once it has been coupled to the accessory plug 14 (FIG. 6). Instead, the retainer 10 may remain on the accessory plug 14 and the cable 18, and it is not necessary to remove or re-attach the retainer 10 to the accessory plug 14 and the cable 18 prior to every use of the accessory plug 14 and the cable 18.

Figure 7:
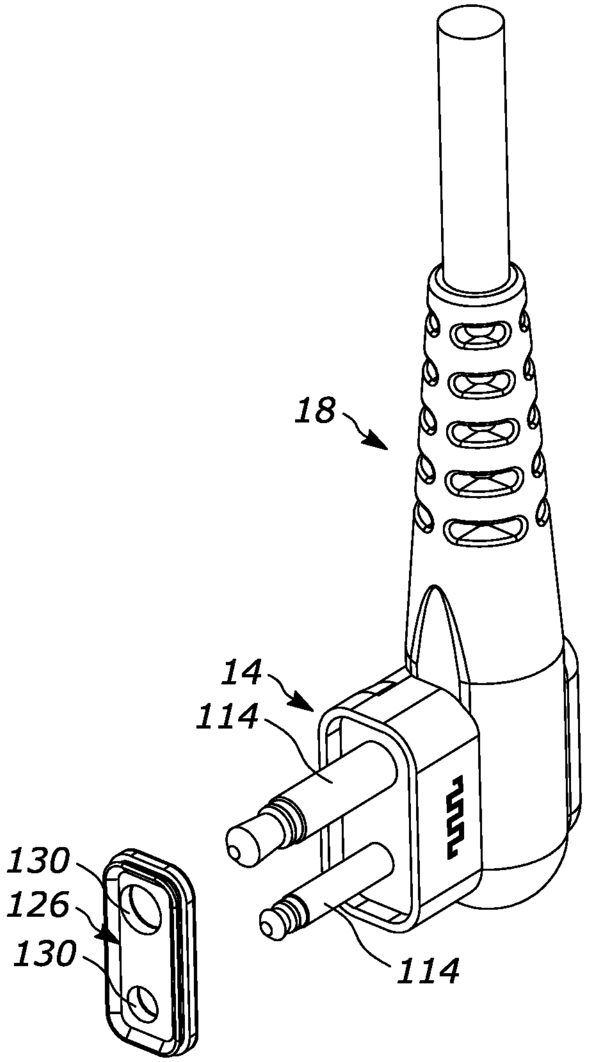
FIG. 7 is a perspective view of the accessory plug and cable, and also a seal configured to be coupled to the accessory plug.
Figure 8:
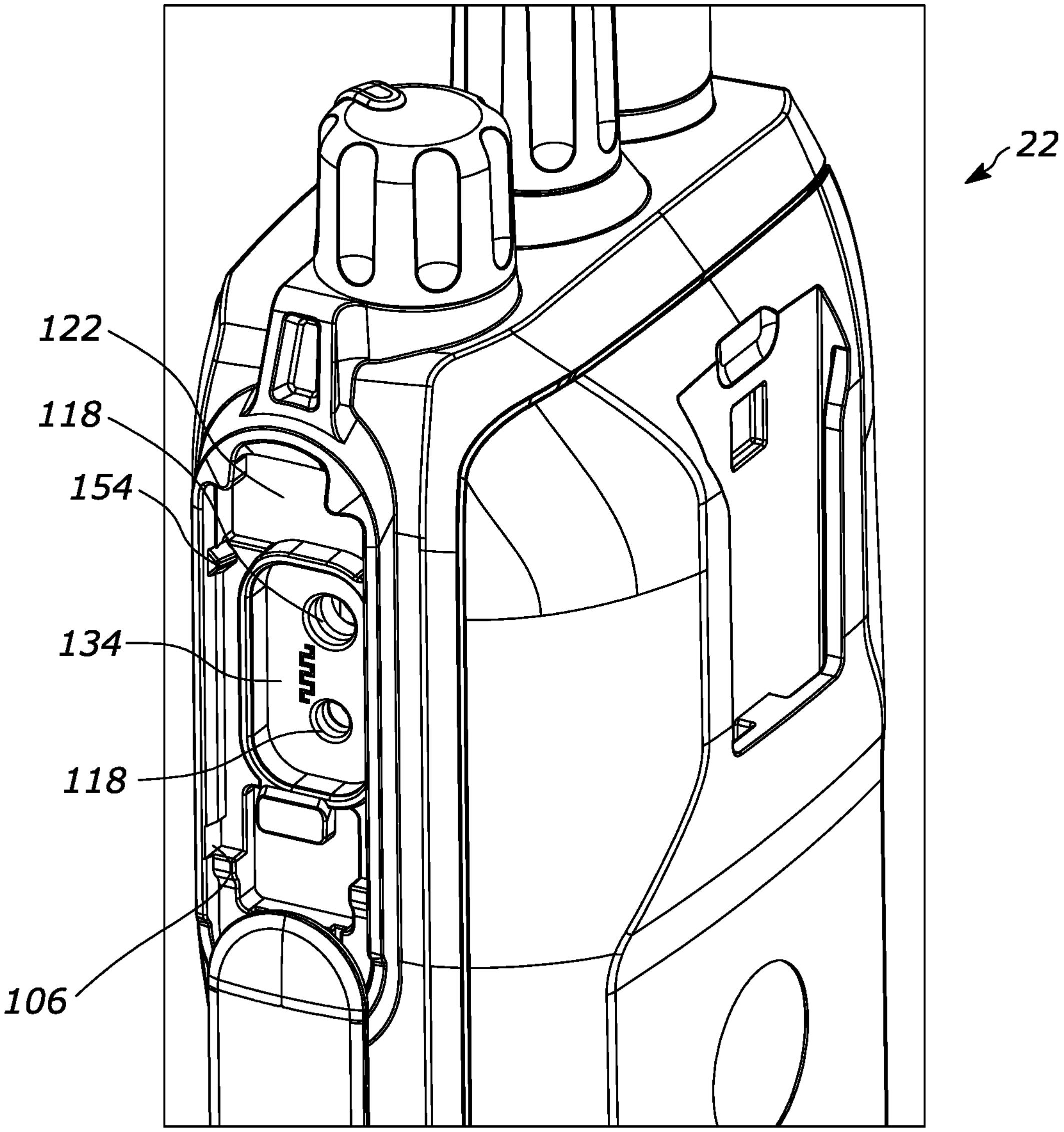
FIG. 8 is a perspective view of the portable communication device, illustrating a recess configured to receive the seal.

With reference to FIGS. 7-14, once the retainer 10 has been coupled to the accessory plug 14 and the cable 18, the retainer 10 may then be used to couple and secure the accessory plug 14 and the cable 18 to the portable communication device 22. For example, and as illustrated in FIGS. 7 and 8, at least one pin 114 (e.g., electrical contact pin) extends from the beneath the accessory plug 14. In the illustrated example, two pins 114 extend from the accessory plug 14. The pins 114 are sized and shaped to be received within corresponding plug openings 118 in an outer wall 122 of the portable communication device 22. Insertion of the pins 114 into the plug openings 118 may create an electrical connection within the portable communication device 22 (e.g., with a printed circuit board).

With continued reference to FIGS. 7 and 8, a seal 126 includes apertures 130 that receive the pins 114. The seal 126 is sized and shaped to be coupled to the accessory plug 14, and to be positioned at least partially between the accessory plug 14 and the outer wall 122 of the portable communication device 22. The outer wall 122 defines a recess 134 along the portable communication device 22, and the seal 126 is sized and shaped to be positioned within the recess 134. The seal 126 may provide a seal between the accessory plug 14 and the portable communication device 22, and may inhibit or prevent water from entering the portable communication device 22.

Figure 9:
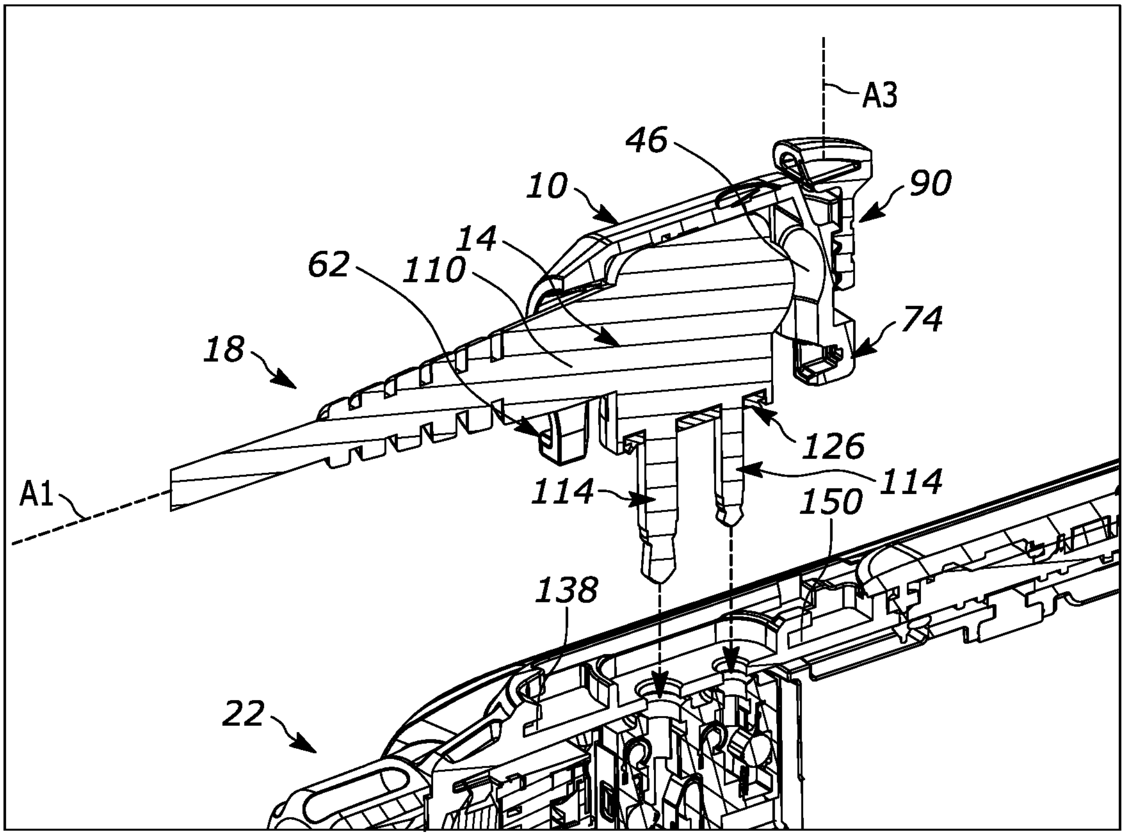
FIGS. 9 and 10 illustrate a first step of coupling the retainer to the portable communication device.

With reference to FIGS. 1 and 9, the outer wall 122 also defines a first slot 138 sized and shaped to receive a portion of the first hook 62 when the retainer 10 is moved forward linearly along the longitudinal axis A1, a second slot 142 sized and shaped to receive a portion of the second hook 66 when the retainer 10 is moved forward linearly along the longitudinal axis A1, a third slot 146 sized and shaped to receive a portion of the third hook 70 when the retainer 10 is moved forward linearly along the longitudinal axis A1, and a fourth slot 150 sized and shaped to receive a portion of the fourth hook 74 when the retainer 10 is moved forward linearly along the longitudinal axis A1. The plug openings 118 extend perpendicularly into the outer wall 122, and are positioned between the first slot 138 and the third slot 146 along the outer wall 122. As described above, the outer wall 122 also includes the recesses 106 that receive the latch lock arms 104 of the latch 90. With reference to FIGS. 2 and 8, in the illustrated example the retainer 10 also includes a detent notch 150 along a side of the retainer 10. The detent notch 150 is sized and shaped to engage a detent bump 154 along the portable communication device 22.

Figure 10:
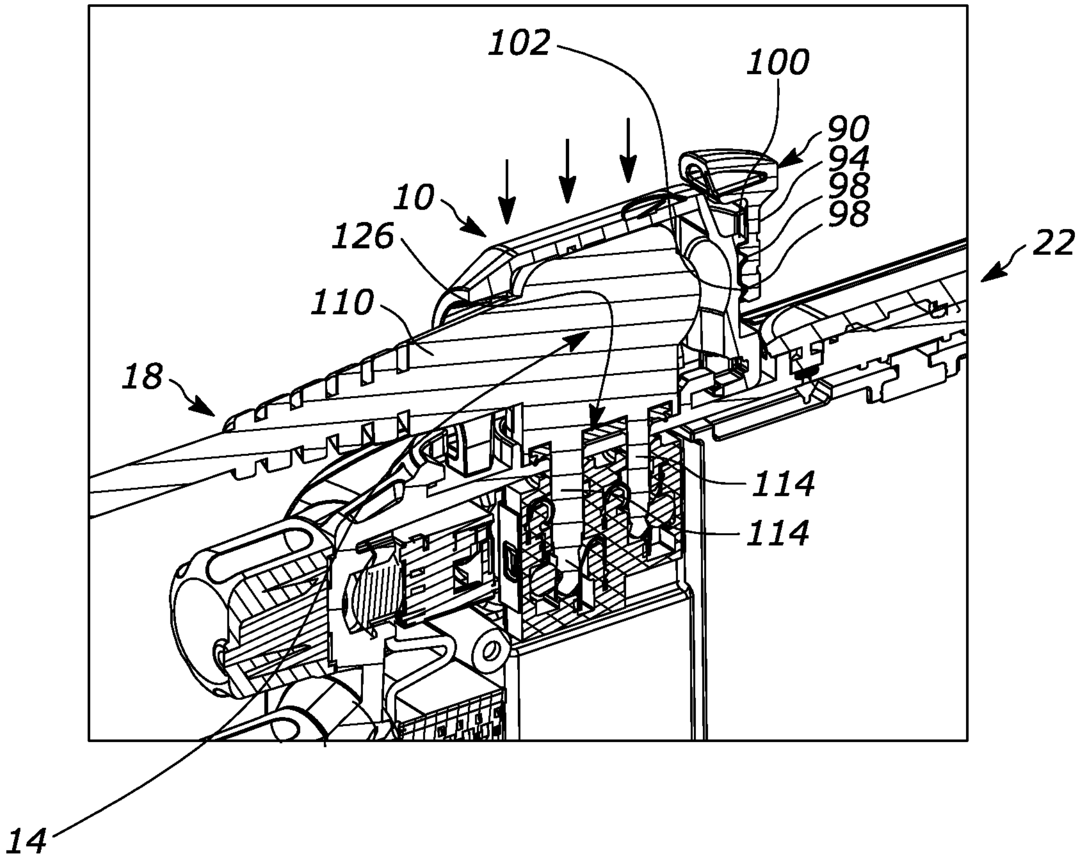

With reference to FIGS. 9-14, in the illustrated example the retainer 10 is coupled to the portable communication device 22 in three steps. As illustrated in FIGS. 9 and 10, in the first step the retainer 10, the accessory plug 14, and the pins 114 are moved (e.g., pressed down) toward the outer wall 122 of the portable communication device 22 along a direction perpendicular to the longitudinal axis A1, until the seal 126 is positioned within the recess 134, and the pins 114 are extended into the plug openings 118.

Figure 11:
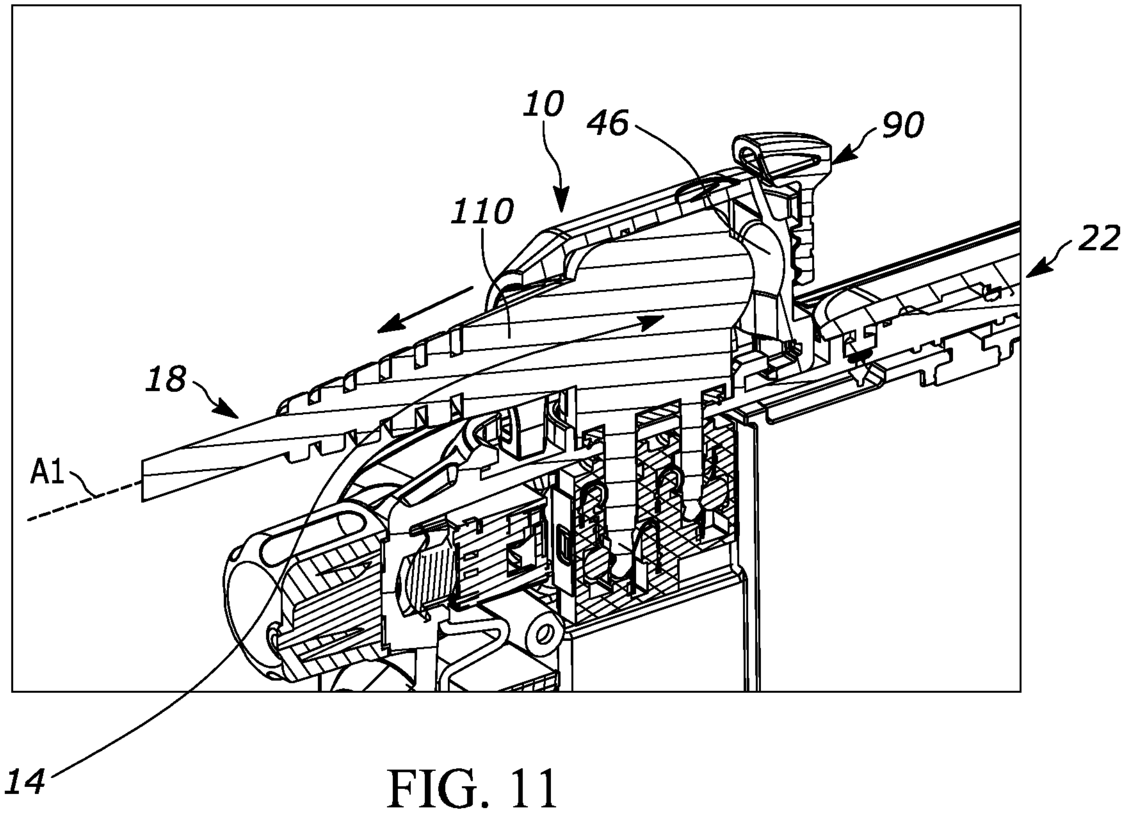
FIGS. 11 and 12 illustrate a second step of coupling the retainer to the portable communication device.

With reference to FIGS. 11 and 12, in the second step the retainer 10 is then moved forward linearly, and parallel to the longitudinal axis A1, to engage the first hook 62, the second hook 66, the third hook 70, and the fourth hook 74 into the respective first slot 138, second slot 142, third slot 146, and fourth slot 150 of the portable communication device 22. In the illustrated example, the first hook 62, the second hook 66, the third hook 70, and the fourth hook 74 engage the first slot 138, the second slot 142, the third slot 146, and the fourth slot 150 simultaneously when the retainer 10 is moved forward linearly along the longitudinal axis A1. In some examples, movement of the retainer 10 during this second step may emit a "click" sound (FIG. 12). During this movement, and in the illustrated example, the detent notch 150 engages the detent bump 154.

With reference to FIGS. 13 and 14, in the third step the latch 90 is then moved (e.g., pressed down) from the unlocked (e.g., raised) position illustrated in FIG. 13 to the locked (e.g., lowered) position illustrated in FIG. 14 (e.g., along the axis A3). In some examples, movement of the latch 90 to the locked position may emit a "click" sound, for example as the protrusion 102 engages the notch 98 (FIG. 14). During this step, the latch lock arms 104 extend into the recesses 106.

Overall, and because of the arrangement of the hooks 62, 66, 70, and 74, the slots 138, 142, 146, and 150, and the latch 90 described above, the retainer 10 may be coupled quickly and securely to the portable communication device 22, and provide a strong cable pull retention, such that it is difficult to simply pull or tug on the cable 18 and detach the accessory plug 14 from the portable communication device 22. Additionally, and as described above, the retainer 10 may remain on the cable 18 when the accessory plug 14 has been detached from the portable communication device 22, such that it is not necessary to re-attach the retainer 10. Additionally, the arrangement of the seal 126 between the accessory plug 14 and the portable communication device 22 may inhibit or prevent water from entering the portable communication device 22 after the retainer 10 has been coupled to the portable communication device 22.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A retainer configured to retain an accessory plug and cable to a portable communication device, the retainer comprising:

a main body having a top wall, a first side wall, a second side wall spaced opposite the first side wall, a front wall, and a rear wall spaced opposite the front wall along a longitudinal axis, wherein the top wall, the first side wall, the second side wall, the front wall, and the rear wall define an interior cavity sized and shaped to receive the accessory plug;

wherein the front wall defines a front opening that extends into the interior cavity and is sized and shaped to receive a portion of the cable;

wherein the front wall includes a first hook and a second hook each positioned below the front opening, wherein the rear wall includes a third hook extending forward into the interior cavity, and wherein the retainer is configured to be moved forward linearly, and parallel to the longitudinal axis, to secure the first hook, the second hook, and the third hook to the portable communications device.

2. The retainer of claim 1, wherein the front wall of the main body has an omega shape when viewed along the longitudinal axis, and wherein a lower portion of the front wall is configured to clip over the cable.

3. The retainer of claim 1, wherein at least a portion of the front opening has a circular shape.

4. The retainer of claim 1, wherein each of the first hook and the second hook includes an L-shaped arm having a first segment that extends down vertically, and a second segment that extends perpendicularly away from the first segment, wherein the second segment of the first hook and the second segment of the second hook extend laterally away from one another.

5. The retainer of claim 4, wherein the second segment of the first hook and the second segment of the second hook are separated from one another by a gap, wherein the front opening has a diameter, and wherein the gap is smaller than the diameter.

6. The retainer of claim 4, wherein both the first hook and the second hook are flexible, and are configured to be flexed laterally apart from one another to clip over the cable.

7. The retainer of claim 1, wherein the rear wall includes a fourth hook extending forward into the interior cavity.

8. The retainer of claim 1, further comprising a detent notch configured to engage a detent bump along the portable communication device.

9. The retainer of claim 1, further comprising a latch coupled to the main body, wherein the latch is configured to be moved between an unlocked position and a locked position.

10. The retainer of claim 9, wherein the latch includes latch lock arms configured to engage corresponding recesses on the portable communication device.

11. The retainer of claim 9, wherein the latch includes a detent arm having a notch, and wherein the rear wall of the main body includes a protrusion configured to engage and disengage the notch.

12. The retainer of claim 9, wherein the latch is movable vertically along an axis that is perpendicular to the longitudinal axis.

13. A system comprising:

the retainer of claim 1; and the portable communication device, wherein the portable communication device includes an outer wall that defines a first slot sized and shaped to receive a portion of the first hook when the retainer is moved forward linearly along the longitudinal axis, a second slot sized and shaped to receive a portion of the second hook when the retainer is moved forward linearly along the longitudinal axis, and a third slot sized and shaped to receive a portion of the third hook when the retainer is moved forward linearly along the longitudinal axis.

14. The system of claim 13, wherein the first hook, the second hook, and the third hook are configured to respectively engage the first slot, the second slot, and the third slot simultaneously when the retainer is moved forward linearly along the longitudinal axis.

15. The system of claim 13, wherein the retainer is configured to first be pressed down along a direction perpendicular to the longitudinal axis before the retainer is moved forward linearly along the longitudinal axis.

16. The system of claim 15, wherein the outer wall of the portable communication device further includes plug openings sized and shaped to receive pins of the accessory plug when the retainer is first pressed down.

17. The system of claim 16, wherein the plug openings extend perpendicularly into the outer wall, along a direction perpendicular to the longitudinal axis.

18. The system of claim 16, wherein the plug openings are positioned between the first slot and the third slot along the outer wall.

19. The system of claim 13, further comprising a seal configured to be coupled to the accessory plug and configured to be positioned at least partially between the accessory plug and the outer wall of the portable communication device.

20. The system of claim 19, wherein the outer wall defines a recess along the portable communication device, wherein the seal is configured to be positioned within the recess.

* * * * *